July 30, 1957
J. CAMPBELL
2,801,069
HYDRO POWER TURBINES
Filed Oct. 31, 1955
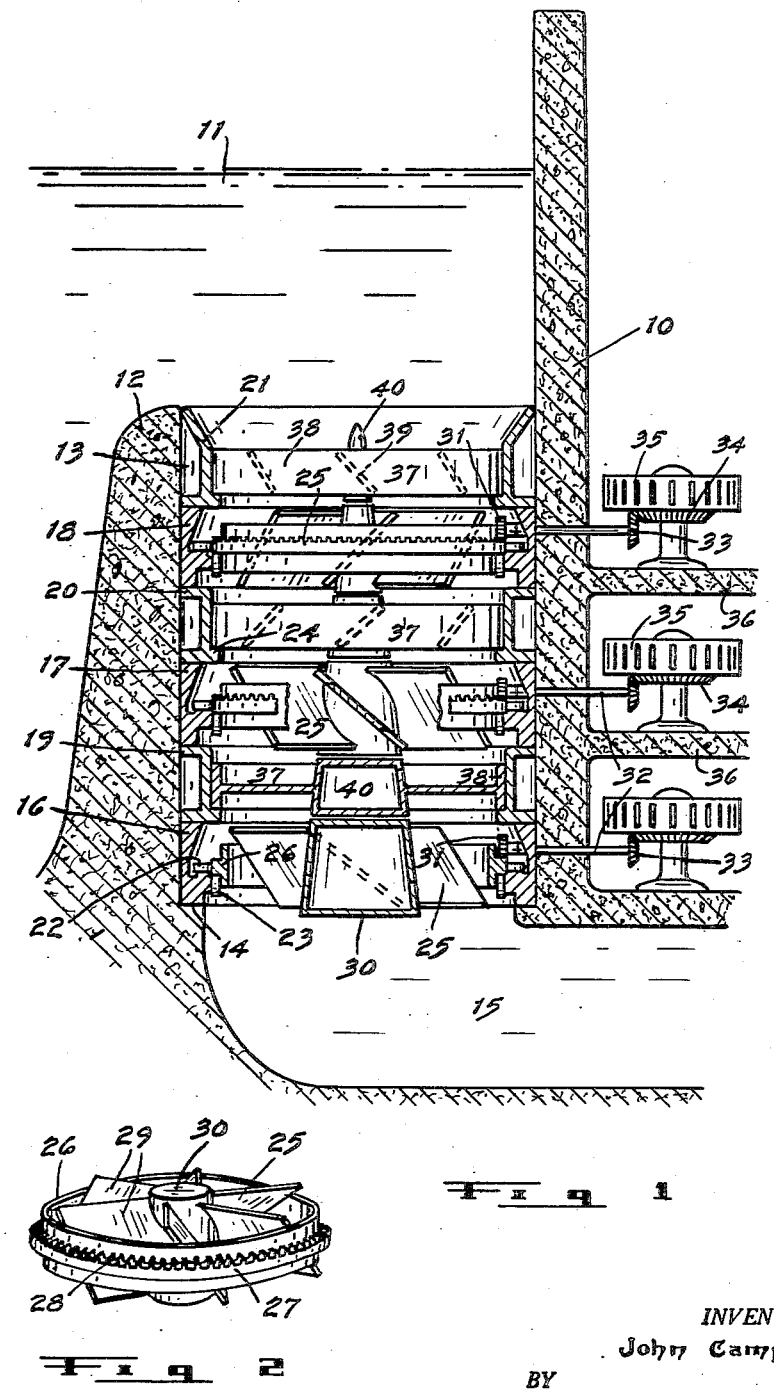
INVENTOR.
John Campbell
BY
AGENT United States Patent Office 2,801,069
Patented July 30, 1957

2,801,069

HYDRO POWER TURBINES

John Campbell, Winnipeg, Manitoba, Canada

Application October 31, 1955, Serial No. 543,999

2 Claims. (Cl. 253—32)

The present practice in hydro power development is to place a water-operable turbine at a low elevation in relation to the surface of dammed-up water and then direct said water, through a downward passage and under pressure of its weight, against the blades of the turbine for rotation thereof. Accordingly, the water moving down said passage does no work until it reaches the blades of the turbine at the bottom, and power is lost. As the water is directed against said blades in a relatively tangential direction to the centreline of the turbine, and then re-directed downwardly by the blades for lower escape, much of the power or kinetic energy produced by the turbine is due to this bending, so to speak.

The principal object of the present invention is to position a plurality of turbines in the said downward passage, one above the other and with stationary guides in between. The arrangement is such that the falling water will be intermittently deflected in its passage movement through the turbines, first one way and then the other, such that adjacent turbines will be rotated in opposite directions, and so obtain increased power development from the continual bending or deflection of the falling water. While it is true that the reaction of the blades of the turbines against rotation will tend to partially support the falling water and so reduce the amount of pressure acting against the blades of the lower turbines, and reduce their power output, the total power output from all the turbines together will greatly exceed the output from a single low positioned turbine as the constantly deflecting water will come into contact with more operable surfaces.

A further object of the invention is to provide each turbine and guide with a central closed hollow hub, the hubs being coned, the lower ones being of larger diameter than the upper ones, and the blades of the lower turbines being of sharper pitch than the upper ones so that the water not only follows a constantly reducing passage area, and therefor increases in speed as well as weight pressure, but the lower turbines will rotate at higher speeds than the upper ones and with increased power.

A still further object of the invention is to provide casing containers for the turbines and guides so they can be progressively inserted into the passage mentioned, in aligned arrangement, and can easily be removed for repairs or replacements.

With the above important and other minor objects in view, which will become more apparent as the description proceeds, the invention consists essentially in the construction, design and arrangement of the parts hereinafter more particularly described, reference being had to the accompanying drawings in which:

Figure 1 is a vertical section through a power site showing a dam wall backing up water for movement through a vertical passage having a plurality of turbine units therein for operation of electric generators carried by the wall, and parts of the turbine units broken away to expose construction.

Figure 2 is a perspective view of one of the turbine rotor units.

In the drawings like characters of reference indicate corresponding parts in the several figures.

A section through a power site is shown in Figure 1 and comprises a dam wall 10 normally holding back a large reservoir of water, indicated at 11. The lower forward part of the dam wall 10 is built out in the water, as indicated at 12, to provide a vertical passage or cylinder 13 therethrough. The lower part of this passage or cylinder carries an inwardly projecting annular ledge 14, the open central part of which communicates with a lower horizontal passageway 15 which passes out through the lower part of the dam wall 10.

A series of vertically spaced turbine unit supporting casings, or rings 16, 17 and 18 are positioned within the passage 13, the ring 16 resting on the ledge 14 and the rings 17 and 18 being thereabove and spaced apart by guide supporting bands 19 and 20 while a further special guide supporting band 21 is positioned above the turbine unit supporting ring 18. The interior faces of the supporting rings 16, 17 and 18 are provided therearound with equi-spaced horizontal rollers 23 and vertical rollers 22. The guide supporting bands each have a lower inwardly projecting shelf 24 therearound while the upper band has its walls outwardly flared and they terminate at or near the upper edge of the passage or cylinder 13.

Turbine units 25 are centrally positioned in the supporting rings 16, 17 and 18 and one of these units is shown in perspective in Figure 2. They comprise an annular wall 26 which is integral with an outer strap ring 27, the upper face of which carries a continuous series of rack teeth 28. The interior of the wall 26 carries a series of angular blades 29 which radiate from a central tapered hub 30, the interior of which is preferably hollow. The blades extend slightly above and below the annular wall and the hub projects slightly past the blades, both top and bottom. The horizontal rollers 23 of the casing rings underlie and support the toothed rings 27 of the turbine units while the vertical rollers 22 ride the outer faces thereof to keep the turbine units in position. The toothed rings mesh with pinions 31 carried on the ends of shafts 32 which pass through the dam wall 10. The opposite ends of these shafts carry bevel pinions 33 which mesh with bevel gears 34 of electric generators 35 which are carried on shelves 36 of the dam wall. Accordingly when the turbine units are rotated by the passing water the generators are operated and electric power is produced.

A series of guide units 37 are carried by the bands 19, 20 and 21 and these units are similar in design to the turbine units, having an annular wall 38, blades 39 and a tapered hub 40 but they are not as deep and sit on the shelves 24 of the bands and are stationary. It will be noted that the upper and lower turbine units have their blades sloping in the same direction while the central turbine unit has its blades sloping in the opposite direction. It will also be noted that the blades of the guide unit directly above each turbine unit are positioned in opposite relation to said turbine unit blades so that water coming down the passage and leaving the guide units will be directed at right angles to said turbine unit blades and so cause said turbine units to revolve.

By observing Figure 1 it will be seen that the blades of the lower turbine units are flatter, or sharper pitch, than the upper turbine units, and that all tapered central hubs, in combination, form what might be termed "a central tapered cone up the passage" so that the water passage area becomes progressively smaller at the lower levels. Accordingly, in operation, the water moves slowly downward at the top and with very little weight pressure as it enters the passage but increases in speed and weight pressure as it goes down so that the upper turbine units will not revolve as fast or develop as much torque as the lower turbine units. However, as the water is first swished one way and then another as it passes therethrough, and this reacts on the various turbine units, the total electric output from all generators will be considerable. It will also be observed that by this special construction all supporting casings and units can be progressively stacked one above the other, in assembling, and can just as effectively be withdrawn for repairs or replacements; it being understood that the driving connections to the electric generators will be installed or dismantled during such stacking or withdrawal.

In this connection it might be mentioned that any number of turbines can be used, depending on the height of the surface of the dammed water. It might also be mentioned that, while I have shown a tapered central cone to reduce the water passage area through the passage, this could also be accomplished by tapering the outer walls of the casings, including the inner walls of the passage or cylinder 13. In the same way, while I have shown drive shafts from the turbines to the electric generators, it will be understood that other means could be used for this purpose or the power could be mechanically connected direct to machinery.

What I claim as my invention is:

1. In a hydro power site having a circular vertical passage therein connecting an upper head of water with a lower exhaust passageway; a power turbine construction therefor, comprising: an annular ledge on the interior wall of said passage; a series of annular turbine and guide supporting members progressively mounted thereon, one above the other, in said passage; a plurality of rotary turbine units and a plurality of stationary guide units mounted in said members, one unit in each member and in alternate relationship; roller means carried by the respective turbine supporting members and the turbine units arranged for rotary movement and centralizing of said turbine units therein; an interior shelf in the respective guide supporting members to support and retain said guide units therein; said turbine units provided with interior sloped radial blades and the blades of adjacent turbine units positioned in opposite angular relationship; said guide units presenting sloped radial blades therein but in reverse direction to the blades of the turbine units therebelow; and means, operable by each of said turbine units for power delivery therefrom.

2. In a hydro power site having a circular vertical passage therein connecting an upper head of water with a lower exhaust passageway; a power turbine construction therefor, comprising: an annular ledge on the interior wall of said passage; a series of annular turbine and guide supporting members progressively and alternately mounted, one above the other, in said passage and on said ledge; a plurality of rotary turbine units rotatably mounted within said turbine supporting members thereup; a plurality of stationary guide units mounted in said guide supporting members and between said turbine units; sloping radial blades in said turbine units and the blades of adjacent said latter units positioned in opposite directions; sloping radial blades in said guide units and in opposite direction to the slope of the blades in the turbine units directly therebelow; individual tapered vertical hubs on each of said units at the centre of said blades, each of progressively smaller diameter from the bottom to the top of said construction; said hubs spaced from each other but presenting an upwardly-converging spaced sectional cone through the centre of said turbine construction; and means, operable by each of said turbine units, for power delivery therefrom.

References Cited in the file of this patent
UNITED STATES PATENTS

| | | |
|---|---|---|
| 99,548 | Faulkner | Feb. 8, 1870 |
| 118,324 | Woodsum | Aug. 22, 1871 |
| 910,170 | Callan | Jan. 19, 1909 |
| 1,461,422 | Jolly et al. | July 10, 1923 |
| 1,945,373 | Nolan | Jan. 30, 1934 |
| 2,608,663 | Wales | Aug. 26, 1952 |